United States Patent
Liu et al.

(10) Patent No.: US 8,802,316 B1
(45) Date of Patent: Aug. 12, 2014

(54) SOLID OXIDE FUEL CELLS HAVING POROUS CATHODES INFILTRATED WITH OXYGEN-REDUCING CATALYSTS

(75) Inventors: Meilin Liu, Alpharetta, GA (US); Ze Liu, Beijing (CN); Mingfei Liu, Atlanta, GA (US); Lifang Nie, Atlanta, GA (US); David Spencer Mebane, Morgantown, WV (US); Lane Curtis Wilson, Bruceton Mills, WV (US); Wayne Surdoval, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 739 days.

(21) Appl. No.: 12/837,757

(22) Filed: Jul. 16, 2010

Related U.S. Application Data (60) Provisional application No. 61/226,126, filed on Jul. 16, 2009.

(51) Int. Cl.
*H01M 2/12* (2006.01)

(52) U.S. Cl.
USPC ........... 429/489; 429/479; 429/484; 429/488; 429/496; 429/482

(58) Field of Classification Search
USPC .................. 429/489, 482, 496, 479, 488.484
See application file for complete search history.

(56) References Cited

U.S. PATENT DOCUMENTS

| | | | |
|---|---|---|---|
| 7,422,766 B2 | 9/2008 | Pham et al. | |
| 7,566,388 B2 | 7/2009 | Sasaki et al. | |
| 7,566,514 B2 | 7/2009 | Lee et al. | |
| 7,691,521 B2 | 4/2010 | Ahmed et al. | |
| 7,696,121 B2 | 4/2010 | McMahon | |
| 7,732,084 B2 | 6/2010 | Liu et al. | |
| 7,736,772 B2 | 6/2010 | Sarkar et al. | |
| 7,744,830 B2 | 6/2010 | Morse et al. | |
| 7,745,031 B2 * | 6/2010 | Larsen et al. | 429/495 |
| 7,763,368 B2 | 7/2010 | Kaye et al. | |
| 2007/0269701 A1 * | 11/2007 | Larsen et al. | 429/33 |
| 2008/0193803 A1 * | 8/2008 | Sholklapper et al. | 429/12 |
| 2009/0061279 A1 * | 3/2009 | Larsen | 429/33 |
| 2009/0142642 A1 * | 6/2009 | Prinz et al. | 429/33 |

OTHER PUBLICATIONS

Wang et al. "Protonic conduction in Ca2+-doped La2M2O7 (M=Ce, Zr) with its application to ammonia synthesis electrochemically"; Materials Research Bulletin 40 (2005) 1294-1302.*

(Continued)

*Primary Examiner* — Patrick Ryan
*Assistant Examiner* — Alex Usyatinsky
(74) *Attorney, Agent, or Firm* — James B. Potts; Brian J. Lally; John T. Lucas (57) ABSTRACT

Solid-oxide fuel cells include an electrolyte and an anode electrically coupled to a first surface of the electrolyte. A cathode is provided, which is electrically coupled to a second surface of the electrolyte. The cathode includes a porous backbone having a porosity in a range from about 20% to about 70%. The porous backbone contains a mixed ionic-electronic conductor (MIEC) of a first material infiltrated with an oxygen-reducing catalyst of a second material different from the first material.

9 Claims, 10 Drawing Sheets

(56) References Cited

OTHER PUBLICATIONS

Kan et al., "Investigating Oxygen Surface Exchange Kinetics of $La_{0.8}Sr_{.20}MnO_{3-\delta}$ and $La_{0.6}Sr_{0.4}Co_{0.2}Fe_{0.8}O_{3-\delta}$ Using an Isotopic Tracer", Journal of the Electrochemical Society, 155 (10) B985-B993 (2008).

Koep et al., "Characteristic Thickness for a Dense $La_{0.8}Sr_{0.2}MnO_3$ Electrode," Electrochemical and Solid State Letters, 8 (11) (2005) pp. A592-A595.

Lou et al., "Improving $La_{0.6}Sr_{0.4}Co_{0.2}Fe_{0.8}O_{3-\delta}$ cathode performance by infiltration of a $Sm_{0.5}Sr_{0.5}CoO_{3-\delta}$ coating," Solid State Ionics 180, Oct. 5, 2009, pp. 1285-1289.

Lynch et al., "Triple-Phase Boundary and Surface Transport in Mixed Conducting Patterned Electrodes," Journal of the Electrochemical Society, 155 (6) pp. B635-B643 (2008).

Mebane et al, "Trivariate, Stereological Length-Radius-Orientation Unfolding Derived and Applied to Alumina-Silicon Carbide Whisker Composites," J. Am. Ceram. Soc., 89 (2) (2006), pp. 620-626.

Mebane et al., A General Method of Solution for the Cluster Variation Method in Ionic Solids, with Application to Diffusionless Transitions in Yttria-Stabilized Zirconia, J Stat Phys (2010) 139: pp. 727-742.

Mebane et al., "A Two-Dimensional Model and Numerical Treatment for Mixed Conducting Thin Films," Journal of the Electromechanical Society, 154 (5) (2007) pp. A421-A426.

Mebane et al., "Bivariate stereological unfolding procedure for randomly oriented chopped fibers or whiskers," Acta Materialia 53 (2005) pp. 4943-4953.

Mebane et al., "Classical, phenomenological analysis of the kinetics of reactions at the gas-exposed surface of mixed ionic electronic conductors," J Solid State Electrochem (2006) 10: pp. 575-580.

Mebane et al., "DC conductivity and dielectric properties in silver chloride, revisited," Phys. Chem. Chem. Phys. 2010, 12, pp. 2478-2487.

Mebane et al., "Interpreting Impedance Response of Silicon Carbide Whisker/Alumina Composites Through Microstructural Simulation," J. Am. Ceram. Soc., 89 (2) (2006), pp. 538-543.

Mebane et al., Refinement of the bulk defect model for $La_xSr_{1-x}MnO_{3\pm\delta}$, Solid State Ionics, 178 (2008) pp. 1950-1957.

Mebane, David Spencer, Dissertation entitled "Discrete Numerical Simulations of Solid Oxide Fuel Cell Electrodes: Developing New Tools for Fundamental Investigation," Issued Nov. 14, 2007, 74 pages.

Murray et al., "Electrochemical performance of $(La,Sr)(Co,Fe)O_3$—$(Ce,Gd)O_3$ composite cathodes," Solid State Ionics 148 (2002) 27-34.

Nie et al., "$La_{0.6}Sr_{0.4}Co_{0.2}Fe_{0.8}O_{3-\delta}$ cathodes infiltrated with samarium-doped cerium oxide for solid oxide fuel cells," Journal of Power Sources 195, Aug. 1, 2010, pp. 4704-4708.

Shaffer, Steven, "Development Update on Delphi's Solid Oxide Fuel Cell System," Pacific Grove, California, 2005 SECA Review Meeting.

Shah et al., "Solid oxide fuel cell cathodes by infiltration of $La_{0.6}Sr_{0.4}Co_{0.2}Fe_{0.8}O_{3-\delta}$ into Gd-Doped Ceria," Solid State Ionics 179 (3008) 2059-2064.

Sholklapper et al., "LSM-Infiltrated Solid Oxide Fuel Cell Cathodes," Electrochemical and Solid-State Letters, 9 (8) A376-A378 (2006).

Xia et al., "Functionally Graded Cathodes for Honeycomb Solid Oxide Fuel Cells," Electrochemical and Solid-State Letters, 5 (10) A217-A220 (2002).

Zhang et al., "$La_{0.8}Sr_{0.2}Co_{0.8}Fe_{0.2}O_3$ Nanoparticles Formed in Micropores of $La_{0.8}Sr_{0.2}MnO_3$-Yttria Stabilized Zirconia Cathodes," Journal of Fuel Cell Science and Technology, vol. 6, Feb. 2009, 011010-1 to 011010-4.

\* cited by examiner

SOLID OXIDE FUEL CELLS HAVING POROUS CATHODES INFILTRATED WITH OXYGEN-REDUCING CATALYSTS

REFERENCE TO PRIORITY APPLICATION

This application claims priority to U.S. Provisional Application Ser. No. 61/226,126, filed Jul. 16, 2009, the disclosure of which is hereby incorporated herein by reference.

GOVERNMENT RIGHTS

This invention was made with Government support under agreement number DE-FC26-02NT41572, awarded by the Department of Energy. The Government has certain rights in the invention.

FIELD OF THE INVENTION

The present invention relates to electrical energy generation systems and, more particularly, to solid oxide fuel cells.

BACKGROUND

Solid oxide fuel cells (SOFC) are a class of fuel cell characterized by the use of a solid oxide material as an electrolyte, which conducts oxygen ions from a cathode to an anode. At the anode, the oxygen ions combine electrochemically with hydrogen and/or carbon monoxide to form water and/or carbon dioxide, respectively. Unlike many other types of fuel cells, solid oxide fuel cells offer great prospects for the most efficient and cost-effective utilization of readily available fuels such as hydrocarbons and gasified coal or a wide variety of ample carbonaceous solids (e.g. municipal solid waste and biomass). Solid oxide fuel cells have a wide variety of applications from use as auxiliary power units in vehicles to stationary power generation with outputs ranging from 100 W to 2 MW, at an energy efficiency of about 60 percent. Solid oxide fuel cells can have multiple geometries. A typical planar fuel cell design has a sandwich-type geometry, where a relatively dense electrolyte is sandwiched between a cathode and an anode. This sandwich type geometry facilitates the stacking of hundreds of cells in series, with each cell typically having a thickness on the order of a few millimeters. Because the ceramics used in conventional fuel cells have limited conductivities at low temperatures, stacks of cells typically run at temperatures ranging from about 500° C. to about 1000° C.

Figure 1:
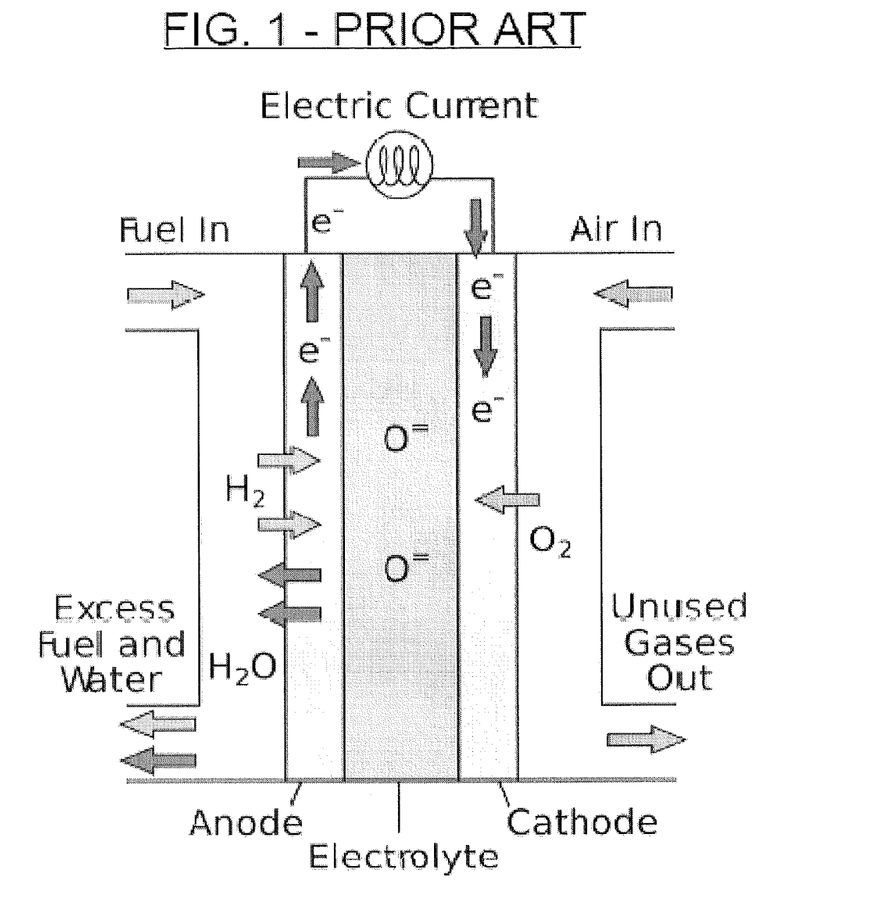
FIG. 1 is a schematic view of a solid-oxide fuel cell according to the prior art.

As illustrated by FIG. 1, operation of a fuel cell begins by a reduction of oxygen into oxygen ions at the cathode. These ions can then diffuse through the solid oxide electrolyte to the anode, where they can electrochemically combine with a fuel, such as a light hydrocarbon fuel (e.g., methane, propane and butane) to form water and carbon dioxide, releasing electrons at the anode, which flow through an external circuit, performing electrical work, back to the cathode.

The anode typically must be highly porous to enable fuel to flow towards the electrolyte. Like the cathode, the anode must conduct electrons with low resistivity and should have high ionic conductivity. A common anode material is a cermet made up of nickel mixed with the same ceramic material used for the electrolyte of the cell, which is typically yttria-stabilized zirconia (YSZ). The anode may be the thickest and strongest layer in each individual cell, because it has the smallest polarization losses and is often the layer used to provide mechanical support to the cell. The function of the anode is to oxidize the fuel efficiently. The electrochemical oxidation of hydrogen within the cell produces heat as well as water and electricity. If the fuel is a light hydrocarbon, such as methane, then another function of the anode is to act as a catalyst for steam reformation of the fuel into hydrogen and carbon monoxide. This additional function provides a benefit to a fuel cell stack because the reforming reaction is endothermic and provides internal cooling to the stack of individual cells.

The electrolyte of a fuel cell is typically a dense layer of ceramic oxide that conducts oxygen ions with preferably high ionic conductivity. However, to prevent leakage currents flowing between the anode and cathode, the electronic conductivity of the electrolyte should be as low as possible. The relatively high operating temperature of solid oxide fuel cells supports high oxygen ion transport through the electrolyte. Popular electrolyte materials include YSZ, scandia-stabilized zirconia (ScSZ)), strontium-magnesium doped lanthanum gallate (LSGM), samarium-doped ceria (SDC), and gadolinium-doped ceria (GDC). Detrimental reactions between YSZ electrolytes and cathode materials, such as lanthanum strontium cobalt ferrite (LSCF), can be prevented using a diffusion barrier/buffer layer (~2 to 5 μm thick), such as samarium or gadolinium-doped ceria.

The cathode of a fuel cell is typically a thin porous layer on the electrolyte where oxygen reduction takes place. Cathode materials must be, at a minimum, electronically conductive. Currently, lanthanum strontium manganite (LSM) is the cathode material of choice for many commercial applications because of its compatibility with doped zirconia electrolytes. This compatibility includes a similar coefficient of thermal expansion (CTE) and a low chemical reactivity with YSZ. Unfortunately, LSM is a relatively poor ionic conductor, which means that an electrochemically active reaction for oxygen reduction is limited to a triple-phase boundary (TPB) where the electrolyte, air and cathode meet.

In order to increase the reaction zone for oxygen reduction beyond the TPB, a cathode material containing a composite of LSM and YSZ has been used because it has a relatively high electron and oxygen ion conductivity. One state-of-the-art cathode is a porous composite of $(La_{0.8}Sr_{0.2})_{0.95}MnO_{3+\delta}$ (LSM) and the solid electrolyte 8% $Y_2O_3$-doped $ZrO_2$ (YSZ), with the volumetric composition of the composite being approximately 40% pore, 35% LSM and 25% YSZ. This composite has been shown to be advantageous relative to porous LSM, because YSZ is a better ionic conductor than LSM. The active area of porous LSM cathode is limited to regions close to the LSM cathode-YSZ electrolyte interface, but in the LSM/YSZ composite, the active area is extended beyond the cathode-electrolyte interface by the availability of YSZ in the porous cathode, which acts as a fast ionic transport pathway.

Unfortunately, the performance of the composite. LSM/YSZ cathode may be limited by the fact that there may be only about 30% connectivity for the YSZ within the composite, which means that inactive YSZ clusters will exist at points relatively far from the electrolyte. This connectivity problem may be overcome by creating a cathode having a non-random composite microstructure using, for example, an infiltration technique. One such infiltration technique includes firing a porous, single phase YSZ backbone, and then infiltrating liquid precursors of LSM into the porous YSZ backbone before re-firing. This technique has been shown to yield a thin dense coating (about 60 nm) of LSM over the YSZ. Unfortunately, even this very thin coating of LSM is typically much less electrochemically active than a morphology with an exposed triple-phase boundary. Moreover, the LSM coating may suffer relatively high sheet resistance at moderate cell current densities.

As an alternative to infiltrating a YSZ backbone with LSM precursors, porous $La_xSr_{1-x}Co_yFe_{1-y}O_{3+\delta}$ (LSCF) has been used as a cathode in solid oxide fuel cell applications because it has much higher ionic and electrical conductivity relative to LSM at intermediate temperatures. But, because LSCF reacts adversely with YSZ, a buffer layer of ionically conductive Gd- or Sm doped ceria ($CeO_2$) can be provided between LSCF and YSZ. Nonetheless, the long-term stability and the catalytic activity of LSCF for oxygen reduction are typically less than that of LSM.

SUMMARY

Solid-oxide fuel cells according to some embodiments of the invention include an electrolyte and an anode electrically coupled to a first surface of the electrolyte. A cathode is also provided, which is electrically coupled to a second surface of the electrolyte. The cathode includes a porous backbone having a porosity in a range from about 20% to about 70%. The porous backbone contains a mixed ionic-electronic conductor (MIEC) of a first material infiltrated with an oxygen-reducing catalyst of a second material different from the first material.

According to some of these embodiments of the invention, the porous backbone includes a mixed ionic-electronic conductor infiltrated with an oxygen-reducing catalyst coating. This coating may have a thickness in a range from about one monolayer to about 30 nm. Alternatively, the porous backbone may include a mixed ionic-electronic conductor infiltrated with oxygen-reducing catalyst nanoparticles.

According to still further embodiments of the invention, the first material is a mixed ionic-electronic conductor selected from a group consisting of lanthanum strontium cobalt ferrite (LSCF), lanthanum strontium cobaltite (LSC) and lanthanum ferrite cobaltite (LFC). The porous backbone may also be formed as a composite of the mixed ionic-electronic conductor and an ionic conductor selected from a group consisting of gandolinium-doped ceria (GDC) and samaria-doped ceria (SDC). The oxygen-reducing catalyst may also be a material selected from a group consisting of lanthanum strontium maganite (LSM), strontium-doped samarium cobaltite (SSC), calcium-doped lanthanum cerate (LCC) such as $La_{1.95}Ca_{0.05}Ce_2O_7$, calcium-doped lanthanum zirconate (LCZ), such as $La_{1.95}Ca_{0.05}Zr_2O_7$, and samaria-doped ceria (SDC).

According to still further embodiments of the invention, a method of forming a solid-oxide fuel cell cathode includes coating a yttria-stabilized zirconia (YSZ) electrolyte with a slurry containing samarium-doped ceria (SDC). A lanthanum strontium cobalt ferrite (LSCF) tape is bonded to the SDC-coated YSZ electrolyte before undergoing a high temperature heat treatment to define a porous LSCF backbone of the cathode. This porous LSCF backbone is then infiltrated with samaria-doped ceria (SDC) as an oxygen-reducing catalyst by, for example, exposing the porous LSCF backbone to a solution comprising samaria-doped ceria precursors, glycine as a complexing agent and propanol as a wetting agent. The step of bonding the lanthanum strontium cobalt ferrite (LSCF) tape to the SDC-coated YSZ electrolyte may be preceded by forming a green tape containing LSCF powder thereon using a tape casting process and then patterning the green tape to define at least one LSCF backbone. The heat treatment may also include firing the LSCF tape with the SDC-coated YSZ electrolyte thereon at a temperature of greater than about 900° C.

According to still further embodiments of the invention, a method of forming a solid-oxide fuel cell cathode includes heat treating a gadolinium-doped ceria (GDC) electrolyte having a lanthanum strontium cobalt ferrite (LSCF) coating thereon to define a porous LSCF backbone, and then infiltrating the porous LSCF backbone with strontium-doped samarium cobaltite (SSC) using, for example, a solution containing SSC and urea as a complexing agent. The infiltrating is then followed by firing the porous LSCF backbone with infiltrated SSC therein at a temperature of greater than about 700° C. The LSCF coating, which may be an iron-rich $La_{0.6}Sr_{0.4}Co_{0.2}Fe_{0.8}O_{3-\delta}$ coating, may be formed by depositing an LSCF slurry onto the GDC electrolyte. Moreover, the heat treatment may include sintering the GDC electrolyte having an LSCF coating thereon at a temperature of greater than about 1000° C.

BRIEF DESCRIPTION OF THE DRAWINGS

FIG. 2b is an enlarged cross-sectional view of a surface of a porous cathode infiltrated with a catalyst, according to the embodiment of FIG. 2a.

DETAILED DESCRIPTION

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer (and variants thereof), it can be directly on, connected or coupled to the other element or layer or intervening elements or layers may be present. In contrast, when an element is referred to as being "directly on,"

"directly connected to" or "directly coupled to" another element or layer (and variants thereof), there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Embodiments of the present invention are described herein with reference to cross-section and perspective illustrations that are schematic illustrations of idealized embodiments (and intermediate structures) of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a sharp angle may be somewhat rounded due to manufacturing techniques/tolerances.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Solid-oxide fuel cells according to some embodiments of the invention include an electrolyte and an anode electrically coupled to a first surface of the electrolyte. A cathode is also provided, which is electrically coupled to a second surface of the electrolyte. The cathode includes a porous backbone having a porosity in a range from about 20% to about 70%. The porous backbone contains a mixed ionic-electronic conductor (MIEC) of a first material infiltrated with an oxygen-reducing catalyst of a second material different from the first material. The porous backbone may include a mixed ionic-electronic conductor infiltrated with an oxygen-reducing catalyst coating. This coating may have a thickness in a range from about one monolayer to about 30 nm. Alternatively, the porous backbone may include a mixed ionic-electronic conductor infiltrated with oxygen-reducing catalyst nanoparticles. In particular, the first material may be a mixed ionic-electronic conductor selected from a group consisting of lanthanum strontium cobalt ferrite (LSCF), lanthanum strontium cobaltite (LSC) and lanthanum ferrite cobaltite (LFC). Alternatively, the porous backbone may be formed as a composite of the mixed ionic-electronic conductor and an ionic conductor selected from a group consisting of gandolinium-doped ceria (GDC) and samaria-doped ceria (SDC). The oxygen-reducing catalyst may also be a material selected from a group consisting of lanthanum strontium maganite (LSM), strontium-doped samarium cobaltite (SSC), calcium-doped lanthanum cerate (LCC), such as $La_{0.95}Ca_{0.05}Ce_2O_7$, and samaria-doped ceria (SDC).

Figure 2A:
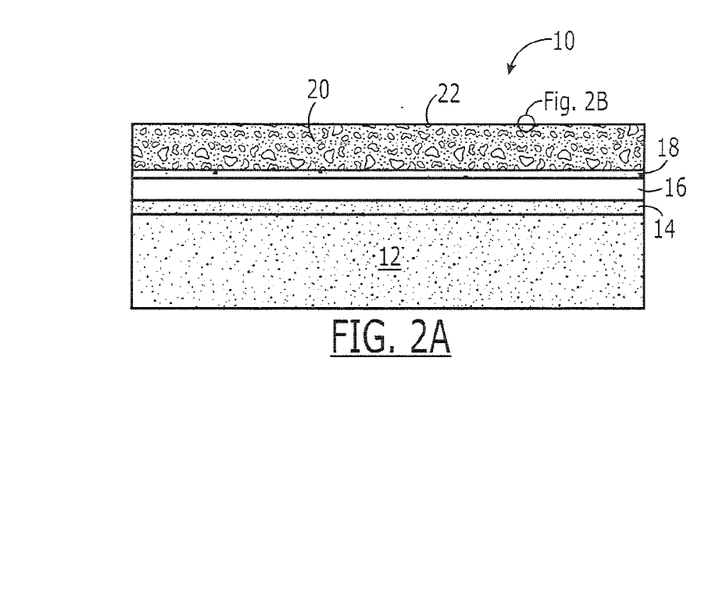
FIG. 2a is a cross-sectional view of a solid-oxide fuel cell according to an embodiment of the present invention.
Figure 2B:
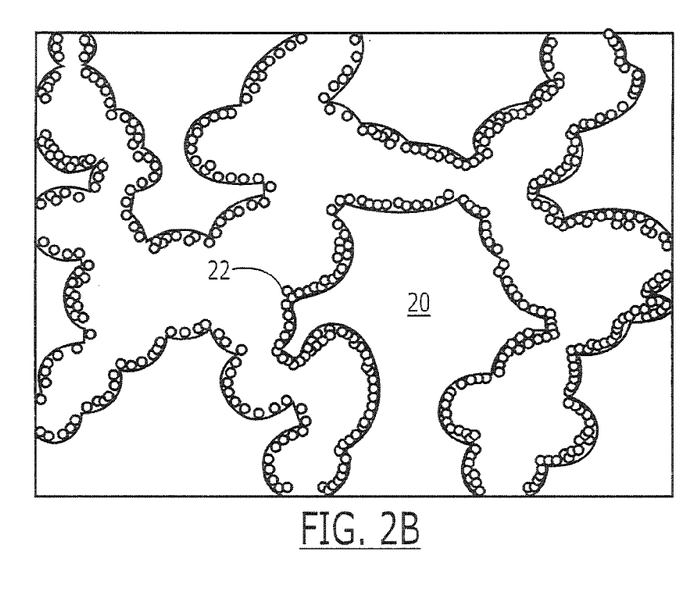

FIG. 2a illustrates a cross-section of a solid-oxide fuel cell 10 according to an embodiment of the invention. This fuel cell 10 includes a stacked composite of an anode substrate 12, an active anode interlayer 14, an electrolyte 16 (e.g., YSZ electrolyte), an SDC barrier layer 18 and an LSCF backbone 20 having a surface thereon that is infiltrated with a catalytic coating 22. The anode substrate 12 may be formed by depositing a composite of NiO-YSZ on a carrier film, which is then dried and pre-fired at 850° C. for duration of about 2 hours. A suspension coating process can be performed to apply the anode interlayer 14 and electrolyte 16 to the anode substrate 12, prior to co-firing the layers at a temperature of about 1400° C. for a duration of about 5 hours. The SDC barrier layer 18 can be fabricated using a suspension coating process and then co-fired with an LSCF tape at a temperature in a range from about 1000° C. to about 1150° C., to define a porous cathode 20. Thereafter, a surface catalytic coating 22 may be applied to the porous cathode 20, as described more fully hereinbelow. This catalytic coating 22 may take the form of an infiltrated layer of nanoparticles or thin continuous film, as illustrated by FIG. 2b.

According to additional embodiments of the invention, an LSM film (about 5 nm) was coated on LSCF cathode backbone using a one-step modified nitrite solution infiltration process. Based on this process, phase formation, microstructure and cathode performance was evaluated along with relationships among process condition, morphology and electrochemical results. According to some of these embodiments of the invention, homogeneous LSM surface modification increases both surface catalytic activity and stability of LSCF-based cathodes as observed in test cells with double-sided cathodes (i.e., symmetric test cells).

In some of these embodiments of the invention, $Gd_{0.1}Ce_{0.9}O_{1.95}$ (GDC) was used as electrolyte due to its high ionic conductivity at intermediate temperatures and low reactivity with LSCF. GDC pellets were prepared by pressing commercial GDC powder (from Rhodia) uniaxially. The pellets were sintered at 1450° C. for five hours, which resulted in relative density of ~98%. LSCF was fabricated by tape casting, and bonded to both sides of the GDC pellet with the thickness of 40 μm by SDC slurry. Porous LSCF electrodes were obtained by sintering at 1050° C. for two hours. Different concentration of aqueous nitrate solutions of LSM and LSCF precursors were prepared by mixing $La(NO_3)_3 \cdot 6H_2O$, $Sr(NO_3)_2$, $Mn(NO_3)_2 \cdot xH_2O$, $Co(NO_3)_6 \cdot 6H_2O$, $Fe(NO_3)_3 \cdot 9H_2O$ and citric acid with corresponding molar ratios. Citric acid acted as a complexing agent to form a correct perovskite phase. Acetone was added into the aqueous solution with a ratio of 1:1 (volume %) to improve the wetting property on the LSCF backbone. A 4 μl of solution was then infiltrated into each side of the porous LSCF electrode using a micro-liter syringe in order to control the amount of loading. A vacuum apparatus was employed to force the solution into the micro pores of the electrode. The infiltrated cell was then fired at 850° C. for two hours to obtain a correct phase. A blank cell without infiltration was also formed for a comparison test. Since both sides of the test cell have the same performance, a reference electrode was not necessary in testing. The impedance spectra were measured under open circuit conditions (OCV). A 10 mV amplitude AC signal over a frequency range from 0.1 Hz to 1 MHz was applied.

A substrate of an anode supported cell was tape casted and pre-fired at 850° C. for two hours, then an NiO-YSZ active layer was coated on the substrate, and a YSZ electrolyte was coated on the active layer, before being co-sintered at 1400° C. for five hours. The LSCF cathode was also tape casted, and bound on the YSZ electrolyte using an SDC slurry, then sintered at 1050° C. for two hours. Plastic tapes with holes, which have a similar size to the cathode, were used to protect the electrolyte and anode parts. A 4 μL of 0.03 mol/L LSM acetone+water solution was then infiltrated into the cathode as described above. The electrode active area was ~0.18 $cm^2$. A Pt mesh was attached to a cathode with Pt paste. The whole cell was mounted on an alumina supporting tube and fired at 850° C. for two hours to form an LSM phase. Then, the temperature was reduced to 825° C. for fuel cell testing under humidified hydrogen (3 vol % $H_2O$) as a fuel, and air as an oxidant. Phase identification was carried out on a diffractometer using Cu Kα radiation. Microstructures were characterized using LEO 1530 thermally assisted field emission scanning electron microscope.

Figure 3:
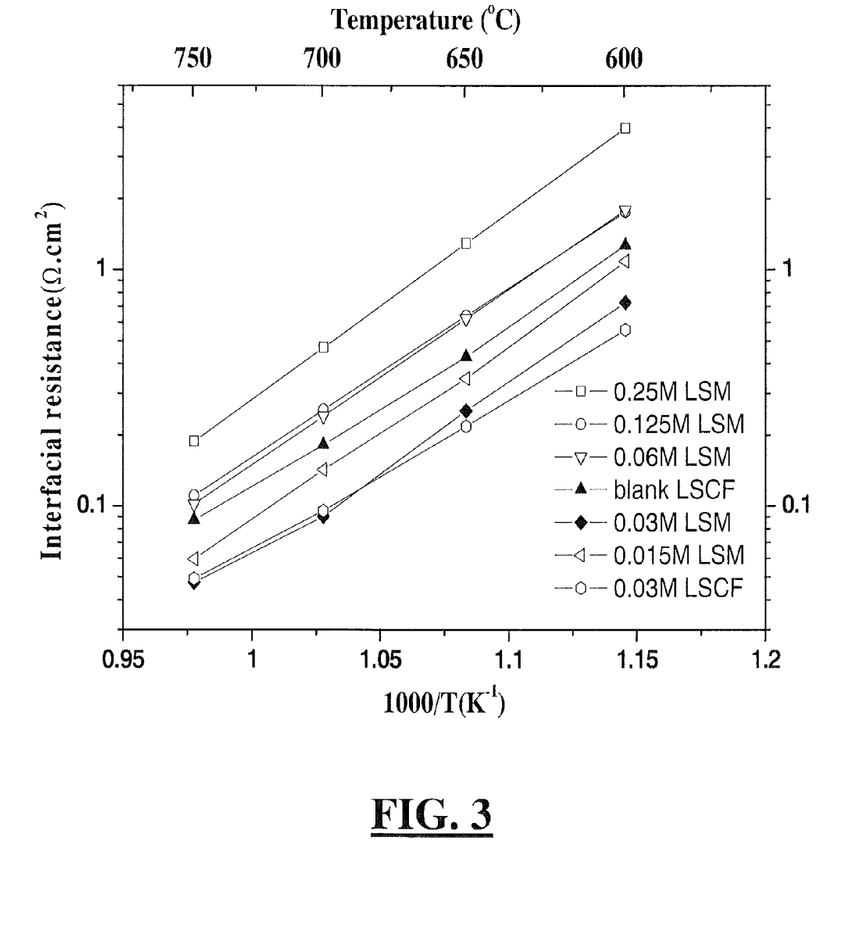
FIG. 3 is a graph that illustrates dependence of interfacial resistance of LSCF cathodes (with and without catalyst infiltration) versus temperature.
Figure 4A:
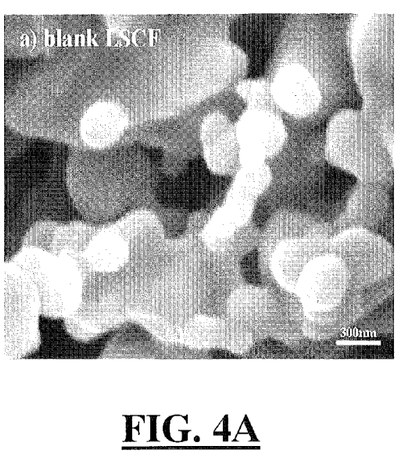
FIGS. 4a-4d are SEM images of a porous LSCF cathode backbone with and without LSM infiltration.
Figure 4B:
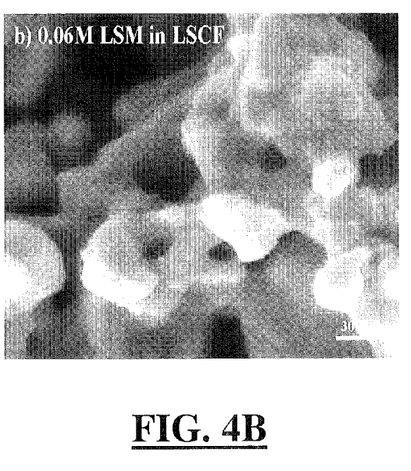
Figure 4C:
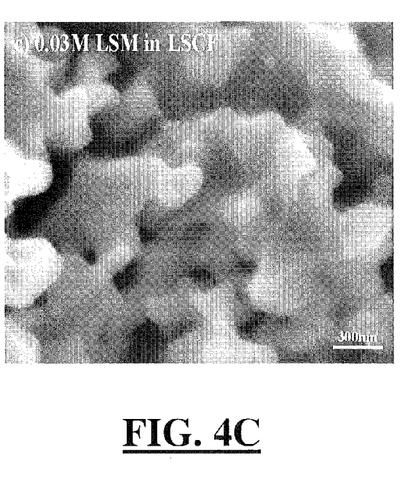
Figure 4D:
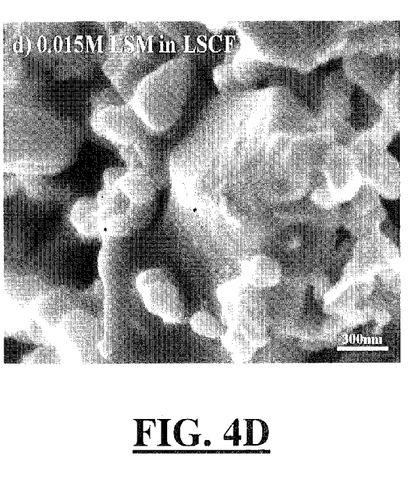

XRD spectra confirmed LSM products from their solution precursors. Based on the analysis using a powder diffraction file (PDF-4), strong perovskite characteristic peaks were identified for LSM. As shown in FIG. 3, a 4 μL LSM solution with the concentration from 0.25 mol/L to 0.015 mol/L and a 0.03 mol/L LSCF solution were infiltrated into an LSCF backbone, and the interfacial resistances ($R_i$) of LSCF cathode test cells with/without LSM and LSCF were identified. The $R_{i,LSM}$ ($R_i$ of LSM infiltrated cell) decreased gradually with the LSM concentration. $R_{i,LSM}$ of LSCF cells with LSM concentration higher than 0.06 mol/L were all larger than the blank cell. When the concentration decreased to 0.03 mol/L, the $R_{i,LSM}$ significantly dropped to a lower range, which is obviously smaller than a blank cell, and showed the approximate $R_i$ of 0.03 mol/L LSCF infiltrated cell. After decreasing the concentration to 0.015 mol/L, the $R_{i,LSM}$ of the cathode began to increase and become close to the blank cell. For the higher concentration, the LSM film is not thin enough to supply a good activation and catalysis. After the concentration was decreased to 0.03 mol/L, a nano film was coated on the LSCF backbone to observe an optimized catalysis. After decreasing to a lower concentration, the LSCF backbone could not be covered uniformly. As a result, 0.03 mol/L LSM solution was selected to infiltrate into the LSCF cathode.

Shown in FIG. 4 are the morphologies of porous LSCF backbones infiltrated with different concentrations of 4 μL LSM solutions. In FIG. 4a, an unmodified blank LSCF backbone is shown with the grain size around 200 nm. Without coating, the surface is clean and the grain boundaries are clear. The image of 0.06 to 0.015 mol/L LSM nitrate solution infiltrated LSCF cathode is shown in FIGS. 4b-4d. LSM catalyst film was uniformly coated on the LSCF grains. The thickness of the film reduced with the concentration of LSM solution decreasing from 20 nm to 5 nm, and the grain size of LSM is about 5-15 nm. The thickness of the 0.06M LSM film is a little thick and exhibits a poor surface and bulk charge transfer, and 0.03M LSM film shows the best thickness of catalysis and coverage of the LSCF surface. After decreasing the thickness to 5 nm, the cathode performance was improved.

Figure 5A:
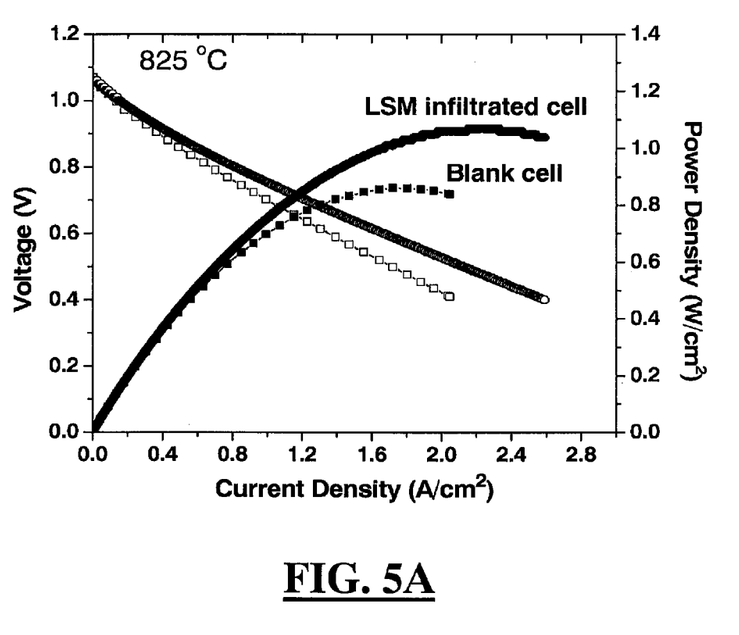
FIGS. 5a-5b are graphs that illustrate the performance of a 0.03 mol/L LSM-infiltrated LSCF cathode in an anode supported cell at 825° C.
Figure 5B:
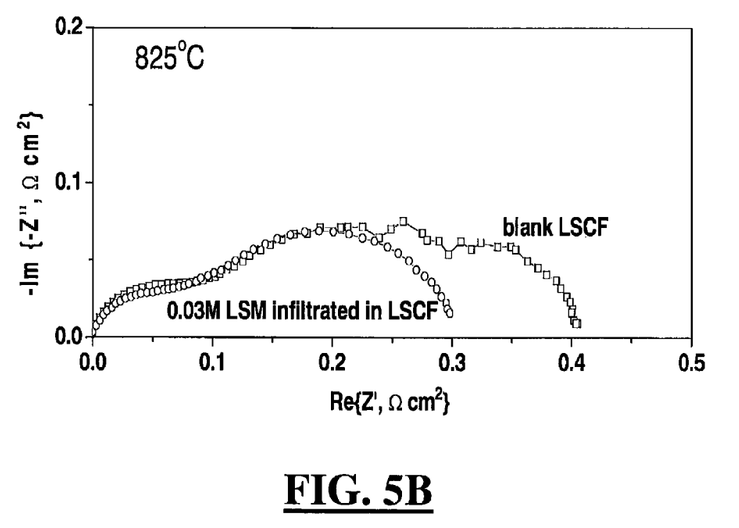
Figure 6:
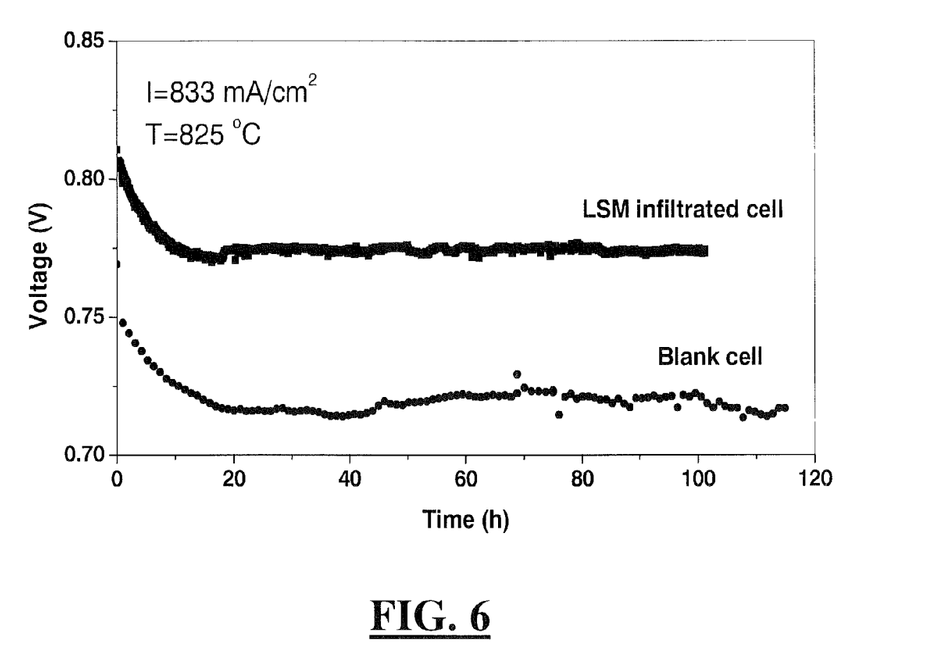
FIG. 6 is a graph that illustrates results of a 100 hour long term testing of a 0.03 mol/L LSM-infiltrated LSCF cathode in an anode supported cell at 825° C.

The methodology of this cathode surface modification can be readily applied to any existing SOFCs to obtain performance enhancement at intermediate temperatures and provides a cheap and reliable way to improve current fuel cell systems. The same concentration was loaded in the anode supported cell, which was operated at 825° C. for 100 hours. FIG. 5a shows the current-voltage curves and power densities of both blank and infiltrated fuel cells at 825° C. The open-circuit voltages (OCV) were 1.07V for both cells. Peak power densities were 0.86 $W/cm^2$ and 1.07 $W/cm^2$. A 24.4% enhancement of peak power density was obtained by LSM infiltration. Usually, the performance of a fuel cell is dominated by cathode, anode and electrolyte. A 24.4% increase of peak power density on a commercial cell is excellent. FIG. 5b observed the impedance spectrum of LSCF with/without infiltrated LSM at 825° C. The blank LSCF cell exhibited an interfacial resistance of 0.404 Ω-$cm^2$, and LSCF infiltration enhanced the cell performance to 0.298 Ω-$cm^2$, which was also mainly due to the increase of electrode surface area and catalytic activity. During 100 hours of operation, a blank LSCF cell increased by about 1%, while the LSM infiltrated cell showed almost no degradation, as shown in FIG. 6. At higher temperature, the LSM infiltrated cells strongly enhanced surface charge-transfer process of oxygen reduction. But, the thin film coating and small nanoparticles did not block gas transport in the porous electrode.

To improve the performance of a good cathode such as LSCF, high electrocatalyst of surface is needed to produce the fast reduction and transportation of oxygen to an oxygen conductor electrode backbone. Higher catalytic activity of LSM nano film promotes the oxygen reduction on the surface of the LSCF backbone. Uniform LSM coating dramatically accelerates the surface exchange kinetics of oxygen molecules. Reduced oxygen ions are transported by either LSCF backbone or LSM nano discontinuous film to the electrolyte. In addition, nanoparticles which nucleate from the surface coating increase the surface area for oxygen reduction. It was just based on cathode modification. Further enhancement can be achieved by improving both anode and electrolyte performances.

According to another embodiment of the invention, a discontinuous nano film (e.g., LSM, or SSC et al.) was coated on a cathode backbone (e.g., LSCF) using a one-step modified nitrite solution infiltration. The novel cathode includes a porous backbone of high ionic and electronic conductivity material infiltrated with a thin coating of catalysts having high stability and catalytic activity toward $O_2$ reduction.

Figure 7:
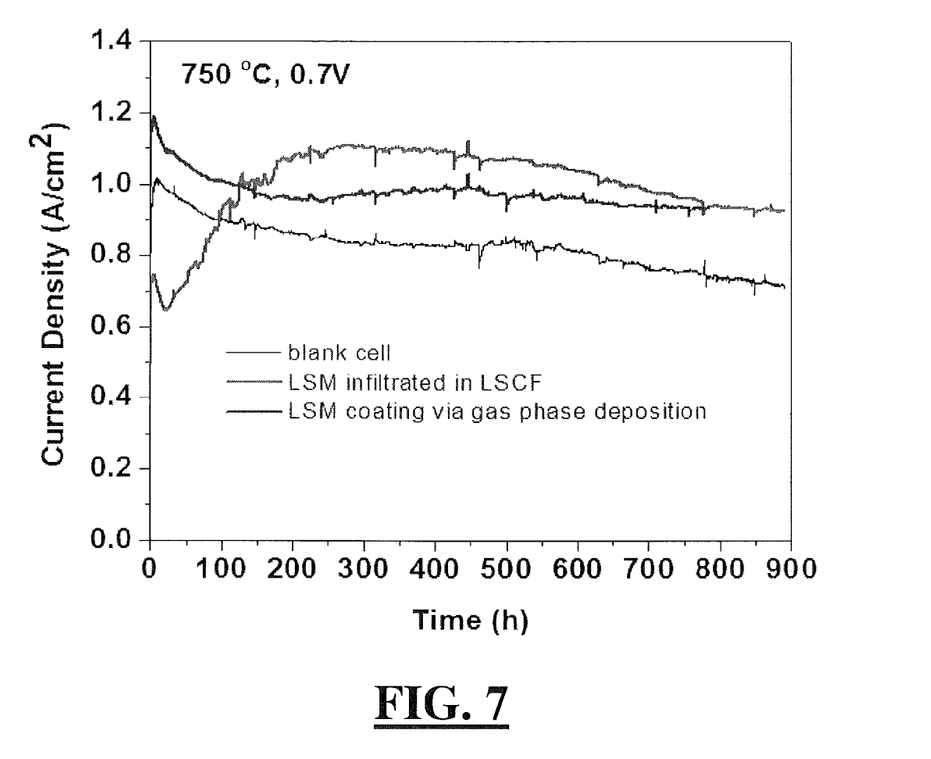
FIG. 7 is a graph that illustrates current densities of cells with blank and LSM-coated LSCF cathodes, as measured at 750° C. under a constant cell voltage of 0.7 V.

To further demonstrate the performance and stability improvements induced by LSM infiltration, long term tests have been performed with anode-supported cells. Shown in FIG. 7 are the current densities of a cell with a blank LSCF cathode and two cells with LSM-coated LSCF cathode tested at 750° C. for about 900 hours at a constant voltage of 0.7V. The LSM coatings were fabricated with two techniques: solution infiltration and gas phase deposition. The performance improvement was immediate for LSCF cathode modified by gas phase deposition, but delayed for about 100 hours for the one modified with infiltration. This delay and the subsequent increase in performance are attributed to the activation of LSM under cathodic polarization. However, performance and stability improvements have been observed for both modifications, indicating that the LSM coatings on LSCF cathode surfaces have improved the performance and stability of the LSCF cathodes.

Figure 8:
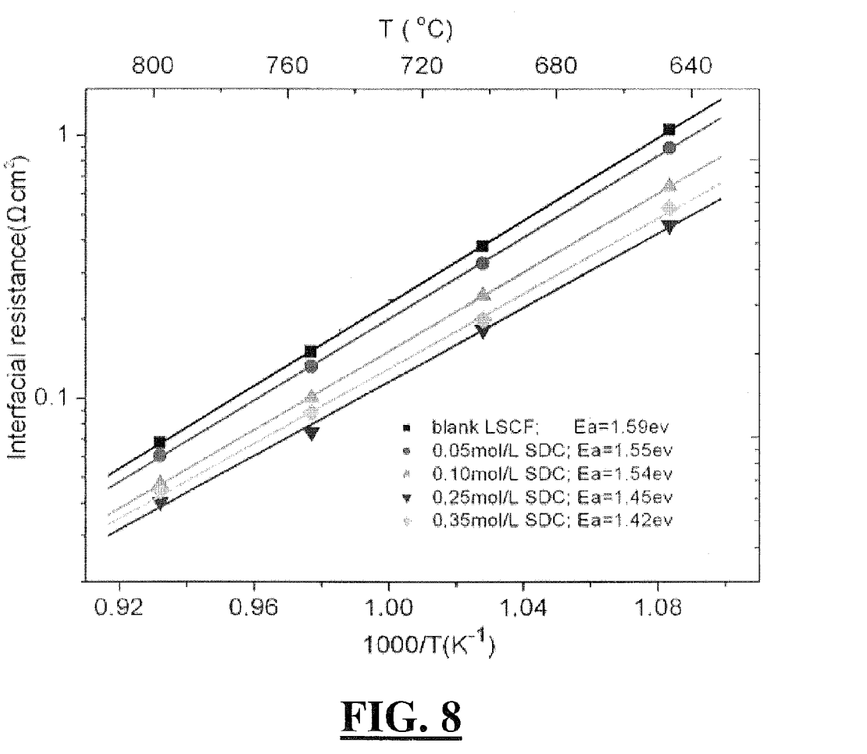
FIG. 8 is a graph that illustrates interfacial polarization resistances and activation energies of blank and SDC-infiltrated LSCF cathodes.

Presented in FIG. 8 are the polarization resistances for a blank LSCF cathode and for SDC infiltrated LSCF cathodes as measured using impedance spectroscopy at 650-800° C. under open circuit conditions. Clearly, the electrode polarization resistances were significantly reduced by increasing the loading of the SDC coating on the LSCF surface, reaching the lowest polarization resistances of 0.074 and 0.44 $\Omega cm^2$ at 750° C. and 650° C., respectively, when a 0.25 mol $L^{-1}$ SDC solution was used for infiltration. These numbers are about half of those for a black LSCF cathode without SDC infiltration measured under the same conditions. However, further increase of the concentration to 0.35 mol $L^{-1}$ resulted in higher polarization resistance. It is believed that excess SDC may degrade the charge transfer processes along the surface and across the interfaces; it may reduce the cathode porosity and block the gas transports. It is also noted that the blank LSCF cathode had the highest activation energies among all the electrodes. However, the activation energies for the SDC-infiltrated LSCF were reduced slightly, suggesting that the $O_2$ reduction on the cathode surface was enhanced by the SDC coating on the LSCF surface.

Figure 9:
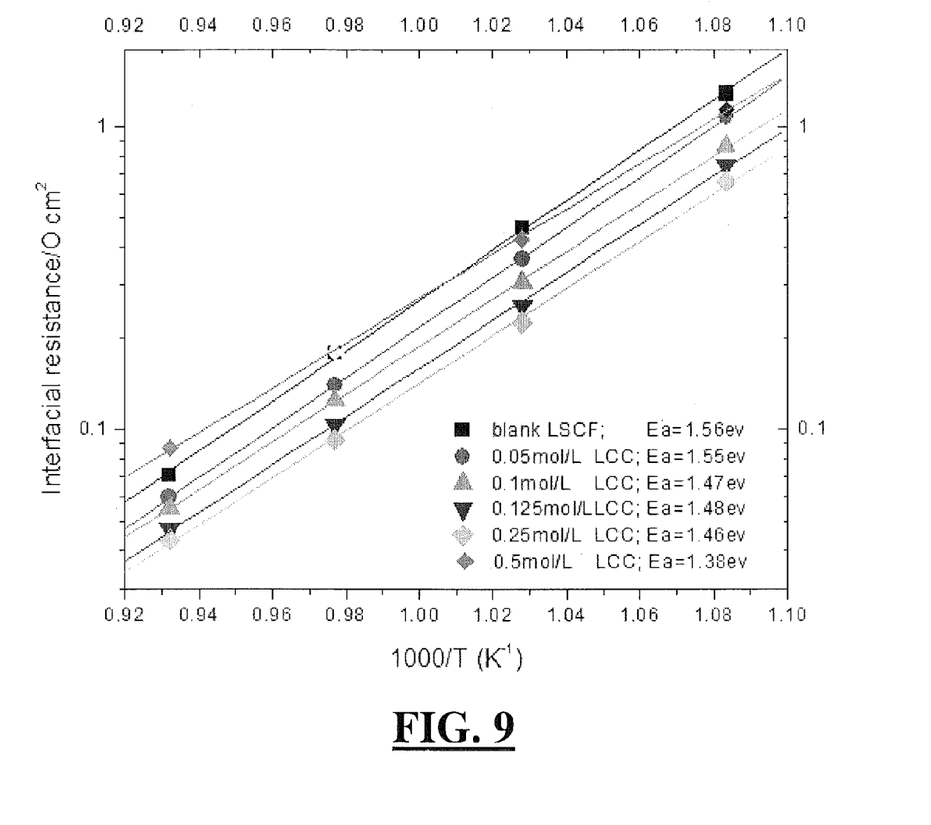
FIG. 9 is a graph that illustrates interfacial polarization resistances and activation energies of blank and LCC-infiltrated LSCF cathodes.
Figure 10:
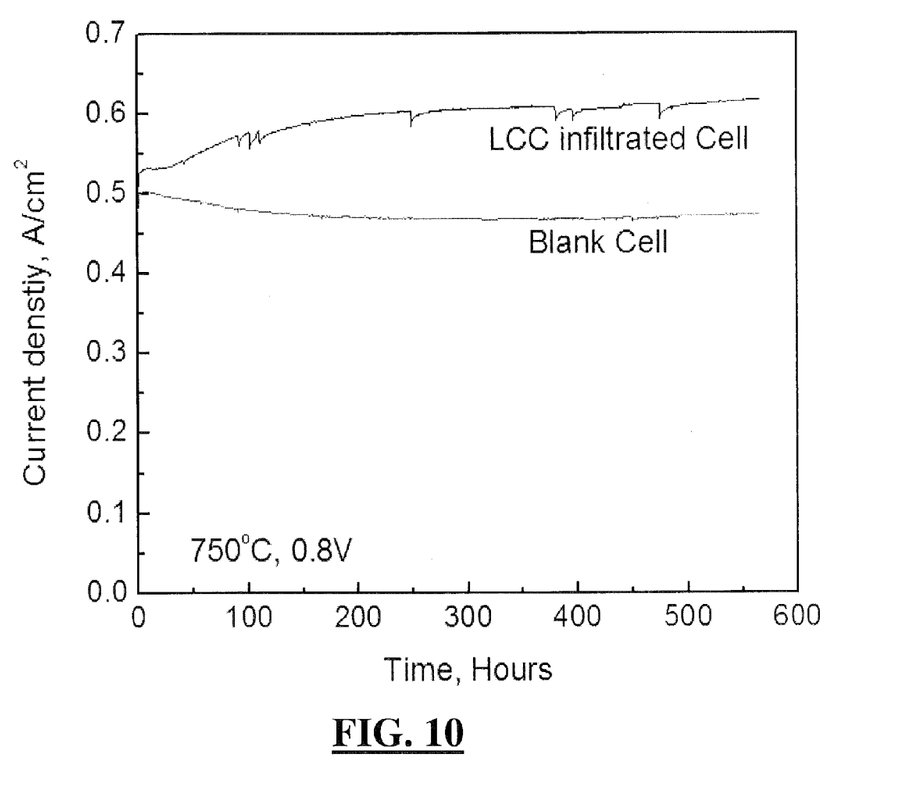
FIG. 10 is a graph that illustrates current densities of cells with blank and LCC-coated LSCF cathodes, as measured at 750° C. under a constant cell voltage of 0.8 V.

Another material, $La_{1.95}Ca_{0.05}Ce_2O_{7-\delta}$ (LCC), was also used as a catalyst coating on LSCF surface. Presented in FIG. 9 are the polarization resistances for a blank LSCF cathode and for LCC infiltrated LSCF cathodes as measured using impedance spectroscopy at 650-800° C. under open circuit conditions. A similar trend was observed for LCC infiltrated LSCF. Significant reduction in electrode polarization resistance was achieved with increase loading of LCC on LSCF. Lowest values of 0.093 and 0.66 $\Omega cm^2$ were achieved at 750° C. and 650° C., respectively, when 0.25 mol $L^{-1}$ LCC solution was used for infiltration. The values are a little higher compared with the values of SDC infiltrated LSCF. Considering the conductivity of LCC is much lower than SDC (about 0.05 S/cm for $SDC^2$ and 0.01 S/cm for $LCC^3$ at 700° C.). The significantly improved performance by LCC infiltration might result from the intrinsic catalytic properties of LCC. Long term stability of the LCC infiltrated cell was tested in an anode supported cell. Presented in FIG. 10 are the current densities of the cell with and without LCC infiltration tested at 750° C. for about 560 hours at a constant voltage of 0.8V. Some degradation was observed for the blank LSCF cathode, the current density was dropped from 0.50 A/cm2 to 0.47 A/cm2, indicating a 6% performance loss. Compared with a blank cell, the current density of the LCC infiltrated cell was slowly increased with the test times. After 560 hours test, the current density is 0.14 A/cm2 higher than the value of the blank cell, which means a 30% improvement. The improved performance and stability achieved by LCC infiltration demonstrate its potential application as catalyst material for LSCF infiltration.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A solid-oxide fuel cell, comprising:
an electrolyte;
an anode electrically coupled to a first surface of the electrolyte; and
a cathode electrically coupled to a second surface of the electrolyte, the cathode comprising a porous mixed ionic-electronic conductor (MIEC) having a porosity in a range from about 20% to about 70% and comprising a plurality of pores, and the cathode further comprising an oxygen-reducing catalyst coating, where the oxygen-reducing catalyst coating comprises an oxygen-reducing catalyst where,
the porous mixed ionic-electronic conductor comprises a perovskite having a composition $La_{1-x}A_xB_{1-y}B'_y$ where A comprises a strontium (Sr) element at the A-site of the perovskite, B comprises a cobalt (Co) element at the B-site of the perovskite, and B' comprises an iron (Fe) element at the B-site of the perovskite, and where $0 \le x < 1$ and $0 \le y < 1$ and where,
the oxygen-reducing catalyst is selected from a group consisting of lanthanum strontium manganite (LSM), strontium-doped samarium cobaltite (SSC), calcium-doped lanthanum cerate (LCC), calcium-doped lanthanum zirconate (LCZ), gadolinium-doped ceria (ODC) and samaria-doped ceria (SDC) and where,
the oxygen-reducing catalyst coating has a thickness in a range from about one monolayer to about 30 nm and where,
some portion of the plurality of pores in the porous mixed ionic-electronic conductor (MIEC) have a pore surface where the oxygen-reducing catalyst coating is directly on the pore surface.

2. The solid-oxide fuel cell of claim 1, wherein the oxygen-reducing catalyst coating is comprised of a plurality of nanoparticles, where each nanoparticle in the plurality of nanoparticles is comprised of the oxygen reducing catalyst.

3. The solid-oxide fuel cell of claim 1, wherein the LCC is $La_{1.95}Ca_{0.05}Ce_2O_7$.

4. The solid-oxide fuel cell of claim 1 where the plurality of pores has an average pore size greater than about 0.3 µm.

5. The solid-oxide fuel cell of claim 1 where the oxygen-reducing catalyst coating is a discontinuous film.

6. The solid-oxide fuel cell of claim 2 where the cathode has a first interfacial resistance less than or equal to about 0.45 $\Omega cm^2$ at about 650° C. and has a second interfacial resistance less than or equal to about 0.074 $\Omega cm^2$ at about 750° C.

7. The solid-oxide fuel cell of claim 1 where x>0 and y>0, such that the mixed ionic-electronic conductor is lanthanum strontium cobalt ferrite (LSCF).

8. The solid-oxide fuel cell of claim 7 where the oxygen-reducing catalyst is lanthanum strontium manganite (LSM).

9. A solid-oxide fuel cell, comprising:
an electrolyte;
an anode electrically coupled to a first surface of the electrolyte; and
a cathode electrically coupled to a second surface of the electrolyte, the cathode comprising a porous mixed ionic-electronic conductor (MIEC) having a porosity in a range from about 20% to about 70% and comprising a plurality of pores, where the plurality of pores has an average pore size greater than about 0.3 µm, and the cathode further comprising an oxygen-reducing catalyst coating, where the oxygen-reducing catalyst coating comprises an oxygen-reducing catalyst where,
the porous mixed ionic-electronic conductor comprises a perovskite having a composition $La_{1-x}A_xB_{1-y}B'_y$, where A comprises a strontium (Sr) element at the A-site of the perovskite, B comprises a cobalt (Co) element at the B-site of the perovskite, and B' comprises an iron (Fe) element at the B-site of the perovskite, and where $0 \leq x < 1$ and $0 \leq y < 1$ and where, the oxygen-reducing catalyst is selected from a group consisting of lanthanum strontium manganite (LSM), strontium-doped samarium cobaltite (SSC), calcium-doped lanthanum cerate (LCC), calcium-doped lanthanum zirconate (LCZ), gandolinium-doped ceria (GDC) and samaria-doped ceria (SDC) and where, the oxygen-reducing catalyst coating has a thickness in a range from about one monolayer to about 30 nm and where, some portion of the plurality of pores in the porous mixed ionic-electronic conductor (MIEC) have a pore surface where the oxygen-reducing catalyst coating is directly on the pore surface.

\* \* \* \* \*